Inventor
F. P. MASON
By [signature]
Attorney

Oct. 31, 1961 F. P. MASON 3,006,999
FACSIMILE PHASING, CALL, AND ANSWER BACK APPARATUS
Filed March 3, 1959 4 Sheets-Sheet 2

Inventor
F.P. MASON
By R P Morris
Attorney

Oct. 31, 1961 F. P. MASON 3,006,999

FACSIMILE PHASING, CALL, AND ANSWER BACK APPARATUS

Filed March 3, 1959 4 Sheets-Sheet 3

*Inventor*
F.P. MASON
By [signature]
*Attorney*

Oct. 31, 1961 F. P. MASON 3,006,999

FACSIMILE PHASING, CALL, AND ANSWER BACK APPARATUS

Filed March 3, 1959 4 Sheets-Sheet 4

*Inventor*
F.P. MASON
By [signature]
*Attorney*

United States Patent Office

3,006,999
Patented Oct. 31, 1961

3,006,999
FACSIMILE PHASING, CALL, AND ANSWER BACK APPARATUS

Frederick Percival Mason, Croydon, England, assignor to Creed & Company Limited, Croydon, England, a British company Filed Mar. 3, 1959, Ser. No. 796,790
Claims priority, application Great Britain Mar. 14, 1958
8 Claims. (Cl. 178—69.5)

This invention relates to facsimile apparatus.

When there is a message to be transmitted from one facsimile station to another, a calling signal is sent from the transmitter and connection with the recorder is established. It is known for a signal, known as a "go-ahead" signal, to be sent back by the recorder, or by an operator at the recorder, over a different channel to indicate that the called apparatus has responded to the calling signal in a normal way and has reached a condition in which it may effectively record a message. It is not until the go ahead signal is received at the transmitter that transmission of the message is started.

Great difficulty is experienced in obtaining reliable recognition of these control signals when the transmitter and recorder are connected over voice frequency lines of widely differing characteristics and on which interference frequently occurs. It is an object of the present invention to provide a control signalling arrangement for facsimile apparatus which will give reliable operation over a wide variety of lines, including long distance telephone lines which may include repeaters and echo suppressors.

One embodiment of the present invention will now be described with reference to the accompanying drawings, in which the invention is shown incorporated in a facsimile transceiver.

Figure 1:
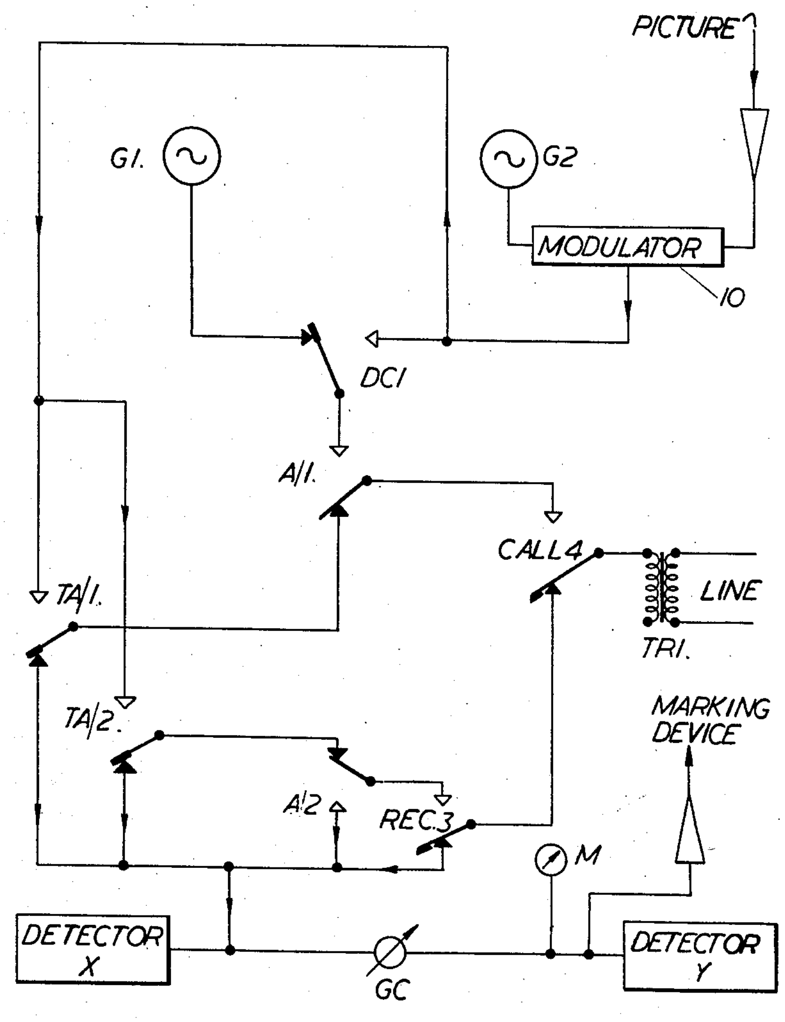
Figure 2:
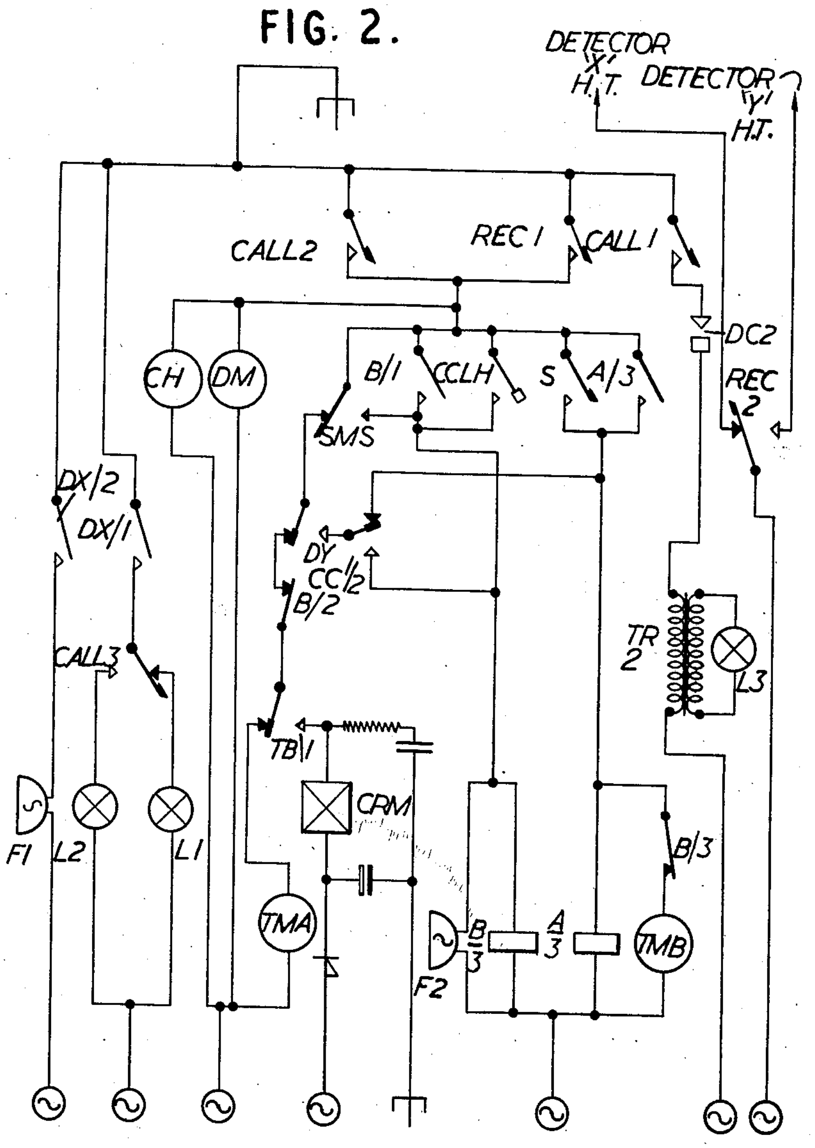
Figure 3:
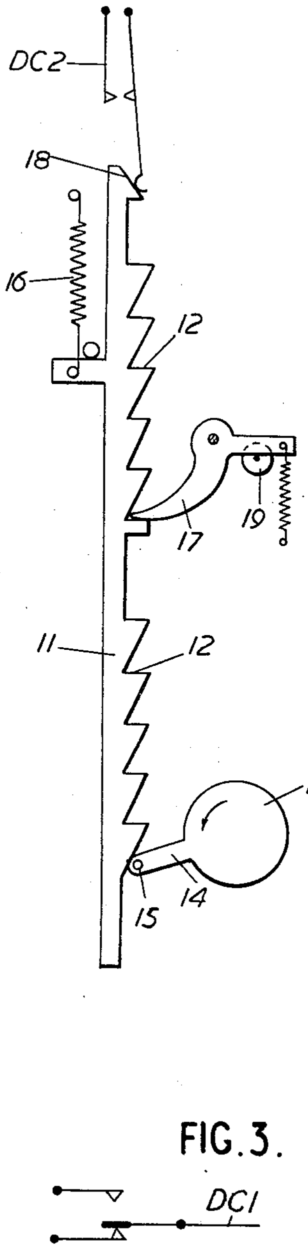
Figure 4:
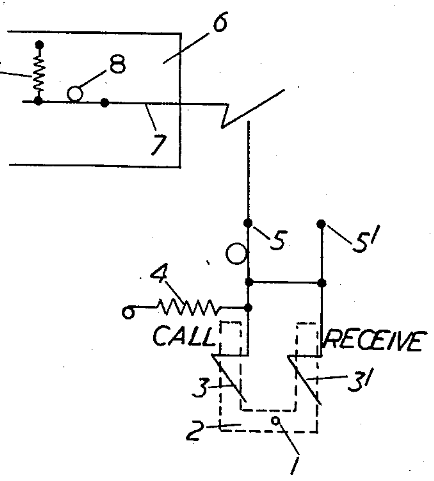
Figure 5:
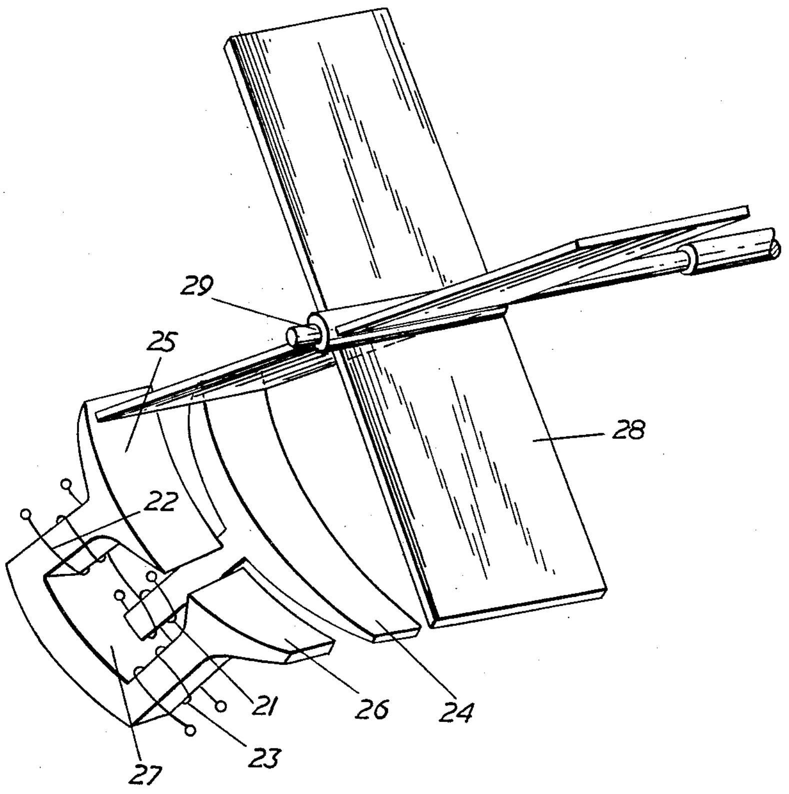

FIG. 1 of the accompanying drawings shows a line circuit at the facsimile transceiver, FIG. 2 shows a local circuit associated with the line circuit of FIG. 1, FIGS. 3 and 4 show diagrammatically mechanical details of apparatus associated with the circuits of FIGS. 1 and 2, and FIG. 5 shows an electromagnetic coupling means which may be used in place of either of the contacts TA1 or TA2.

The operation of the facsimile transceiver will be described first of all as a transmitter (i.e. a calling apparatus), when it will be stated what signals are received from the recorder in response to the transmitter, but no explanation of their production will be given. Then there will follow a description of the operation of the transceiver as a recorder or receiver (i.e. a called apparatus).

*Transmission*

When a message is to be transmitted, the operator at the calling apparatus places a message form in a position from which scanning on a scanning drum can immediately commence. The operator then moves into the CALL position a control switch 1 (FIG. 4) which runs in a channel 2. This movement is against the action of a spring (not shown) which tends to move the control switch 1 continuously in a direction from the CALL position towards the standby position in which it is shown in FIG. 4. During this movement the switch opens a latch 3 against the action of a spring 4, the latch 3 pivoting about the point 5 to admit the switch 1 and then locking the switch 1 in the CALL position. In the CALL position the switch 1 causes four contacts CALL 1, 2 and 3 (FIG. 2) and CALL 4 (FIG. 1) to be operated.

Contacts CALL 1 are therefore closed, and a circuit to the primary winding of a transformer TR2 is prepared for operation. Contacts CALL 2 are closed, thereby causing three motors to rotate, a chopper disc motor CH, a motor TMA which drives a timer TA (not shown), and a scanning drum motor DM. At this time the scanning drum motor DM is in the idling condition, that is to say a clutch release magnet CRM which is provided to control the coupling of the scanning drum motor DM to the scanning drum (not shown) is unoperated and the scanning drum is at rest. Contacts CALL 3 are changeover contacts and are moved to the position in which a lamp L2, which is a "Receiver Ready" lamp, will light when contacts DX/1 are operated. Contacts CALL 4 are also changeover contacts and are moved to the position in which the line is connected directly to contacts A/1.

Timer TA consists of a synchronous motor which drives two cams on separate shafts at different speeds through appropriate gearing, the two cams controlling respectively contacts TA/1 and TA/2 (FIG. 1). When the timer motor TMA is rotating, these contacts TA/1 and TA/2, which are both changeover contacts, are cyclically made and broken. The cycle for contacts TA/1 has a period of 5 seconds, the normally open contacts being closed for 3 seconds and then opened for 2 seconds. During the 3 second part of the cycle, the output of an oscillator G2 is sent to the line through contacts TA/1, contacts A/1, contacts CALL 4, and line transformer TR1. During the 2 second part of the cycle, the signal from oscillator G2 is prevented from going to the line, and the line is connected through contacts CALL 4, contacts A/1 and contacts TA/1 to detector X. Contacts REC 2 (FIG. 2) are in their normal position and detector X has its HT voltage connected, so that it will respond if a signal within the range to which it is responsive appears on the line. Detector X in fact responds to the frequency of the oscillator G2.

The condition of signal from the oscillator G2 being sent to the line is called the "shout" condition, while the condition of detector X connected to the line is called the "listen" condition. This alternating "shout-listen" condition comprises the calling signal sent out by the calling apparatus and continues without interruption.

It will be appreciated that, although the go-ahead signal for which detector X is listening during the "listen" period of the calling signal is, in this example, of the same frequency as the calling signal, it could be of a quite different frequency. In that event detector X need not be responsive to the calling signal frequency and could be connected to the line continuously. The operation of timer contacts TA/1 could then be solely for the purpose of making and breaking the connection of the G2-oscillator to the line to provide the calling signal.

The cycle for the contacts TA/2 of the timer TA has a period of only 600 milliseconds, the contacts TA/2 being in one position for 300 m.s. and then in the other for 300 m.s. When the transceiver is being used as a transmitter, the operations of contacts TA/2 are idle operations.

When the receiver is ready for phasing and transmission to start, the operator there causes a go-ahead signal to be sent back to the transmitter. This go-ahead signal consists of a G2-frequency signal lasting approximately 300 m.s. followed by an interval of approximately 300 m.s. and so on continuously. During a "listen" condition at the transmitter, these 300 m.s. signals of G2 frequency will cause the detector X to respond. Detector X may, for example, consist of an amplifier, which amplifies a received signal, a rectifier and a relay DX (not shown). This detector X could be slow operating and so may be sharply tuned to the G2 frequency. Relay DX is therefore operated when a signal of sufficient strength is received from the line during a "listen" condition of the calling signal. The contacts DX/1, DX/2 (FIG. 2) of this relay are therefore operated for the period during which a signal is being received from the called apparatus.

When the contacts DX/1 close, they complete a power circuit via contacts CALL 3 to light the "Receiver Ready" lamp L2. Similarly the contacts DX/2 also close applying power to a buzzer F1, which sounds.

If a genuine go-ahead signal is being received from the called apparatus, it will happen that three flashes of 300 milliseconds duration each will occur on the "Receiver Ready" lamp L2 in some of the "listen" intervals at the transmitter. This receipt of three complete flashes at regular intervals, accompanied by the sound of the buzzer F1, is quite unmistakeable by the calling operator, even though it will happen that, in some of the "listen" intervals, the three flashes appear as two complete flashes with a bit of a flash at both the beginning and the end of the "listen" condition. In any event, the repetition of flashes of 300 m.s. duration at 300 m.s. intervals during the "listen" periods has a very distinctive rhythm which the calling operator can recognise. He can then proceed in absolute certainty that the called apparatus has responded to the calling signals.

The operator at the calling apparatus then operates a "Send" switch which causes the normally open contacts S (FIG. 2) to close. Because contacts CALL 2 are already operated, this closing of contacts S will operate relay $$\frac{A}{3}$$

and will cause the motor TMB of a timer TB (not shown) to rotate.

The operation of relay $$\frac{A}{3}$$

causes its contacts A/1, A/2 and A/3 to operate. The contacts A/1 (FIG. 1) are changeover contacts and are moved to the position in which they connect the line via line transformer TR1, and operated contacts CALL 4 to contacts DC1 and oscillator G1. Oscillator G1 generates a signal of different frequency from that generated by oscillator G2 and this signal is sent to the line continuously after contacts A/1 have been operated. This signal comprises the phasing signal and is thus initiated by the operation of contacts A/1.

Contacts A/2 are also changeover contacts. Their operation, however, has no effect when the transceiver is being used as a transmitter. The normally open contacts A/3 (FIG. 2) are in parallel with the contacts S of the "Send" switch, and their operation causes the relay $$\frac{A}{3}$$

to lock up in the energised condition and also maintains power for the timer motor TMB after the "Send" switch has been released and the contacts S have opened again.

The timer TB (not shown) consists of a low power synchronous motor which is geared to drive a rotating shaft at a slow speed. On the shaft is an arm which is normally sprung against a stop. When the motor is started into rotation, this arm on the shaft is slowly rotated until, after 250 milliseconds, the arm meets a second stop, in which position contacts TB/1 are made. The motor then stalls, but the rotor holds the arm against the second stop until the power for the motor TB is cut off (as will be described later). The rotor of motor TMB then falls out of engagement with the gears and the arm is sprung back against the first stop.

The effect of this timer TB is that of a slow operating but quick to release relay, which could of course be used instead of the particular timer TB described.

The operation of the contacts TB/1 from their normally closed position removes power from the timer motor TMA. This timer motor TMA does not immediately come to rest, with the result that the contacts TA/1 and TA/2 will go on making and breaking for a time and may finally come to rest in either position (i.e. that shown for each of them or the other one). Contacts TA/2 were not having any effect in any case, and it is permissible for contacts TA/1 to cease, since the calling signal is no longer being transmitted, having been replaced by the phasing signal.

The operation of the contacts TB/1 completes a power circuit through the coil of the clutch release magnet CRM, the operated contacts TB/1, unoperated contacts B/2, DY and SMS, and operated contacts CALL 2. The clutch release magnet CRM is therefore operated and the scanning drum is coupled to the scanning drum motor DM and starts to rotate from its datum rest position. The rotation of the scanning drum also causes the carriage (indicated at 6 in FIG. 4) carrying the optical system to start feeding in well known manner (e.g. gearing of the drum shaft 13 to a lead screw on which the carriage travels), so that the traverse of the optical system starts although the exciter lamp L3 of the system is not yet lighted.

Referring to FIG. 4 again, there is shown, pivotally mounted on a portion 6 of the carriage carrying the optical system and the marking device, an unlatching member 7. The unlatching member 7 is held in a normal rest position against a stop 8 by a spring 9. As the carriage begins to feed, it moves to the right (as seen in FIG. 4) so that the unlatching member 7 strikes a portion of the latch 3 which extends behind the point 5. The unlatching member 7 is so shaped that, when moving to the right it rides up over the extension of the latch 3, turning about its pivot and causing the spring 9 to expand. As soon as the shaped potion of the unlatching member 7 is past the extension of the latch 3, the unlatching member retuns to its normal rest position against the stop 8. The portion 6 of the carriage passes behind the extension of the latch 3 and the only engagement made with the extension of the latch 3 during the movement of the carriage to the right is that described.

In FIG. 3 is shown a counting device 11 which is provided to control the contacts DC1 and DC2. The counting device 11 has on it two sets of steps 12, the lower set of which is the operating set, and the upper set of which is the retaining set. When the scanning drum and its shaft 13 (FIG. 3) start to rotate, an arm 14 carrying a pin 15 rotates with it. The shaft 13 rotates in the direction of the arrow. As the shaft 13 completes its first rotation, the pin 15 engages the lowest step 12 of the operating set of steps and moves the counting device 11 downwards against the action of spring 16 until a pawl 17, which is spring-urged against the counting device 11 and was originally engaging the lowest step 12 of the retaining set, engages the next step 12 of the retaining set.

This first operation of the counting device 11 moves a cam face 18 on the upper end of the counting device 11, so that a pair of contacts DC2, which were previously held open by this counting device 11, are allowed to close.

The pin 15 engages another step 12 on the operating part of the counting device 11 on each of the next four revolutions of the shaft 13. The counting device 11 is thus moved downwards in each of the first five revolutions of that shaft. The downward movement on the fifth revolution of the drum shaft 13 causes the contacts DC1 to be changed over. The operation of these contacts DC1 is timed to occur accurately at the instant at which the scanning drum is rotating through its datum position, i.e. exactly at the end of the fifth drum revolution.

On the sixth and all subsequent revolutions of the drum shaft 13, the pin 15 has no step 12 to operate. The counting device 11 therefore remains in the position to which it was moved at the completion of the fifth revolution of the shaft 13, with both the contacts DC2 and the contacts DC1 closed.

The closing of contacts DC2 (FIG. 2) completes the power circuit through the primary winding of the transformer TR2 which was prepared for operation by the closing of contacts CALL 1 earlier. The exciter lamp L3 therefore lights.

The operation of the contacts DC1 (FIG. 1), which are changeover contacts, from their rest position causes the transmission of the phasing signal from the oscillator G1 to the line to cease. The cessation of the phasing signal is the operative phasing action, and it is this which causes the message drum of the called machine to start rotating. This operation will be described later when considering the operation of the transceiver as a called machine. The operation of the contacts DC1 also causes signals from oscillator G2, modulated by modulator 10 in accordance with the picture or message being scanned, to be sent to the line via operated contacts DC1, A/1 and CALL 4 and the line transformer TR1.

The cutting-off of the phasing signal by operation of the contacts DC1 is delayed until after five revolutions of the drum at the calling machine in order to ensure that sufficient time has been allowed for the scanning drum motors DM at both the calling and called machines to get up to their correct speeds.

When the carriage has travelled approximately ½ inch, it operates changeover contacts CC½. These contacts CC½ may, for example, be the contacts of a microswitch which are held in the position shown in FIG. 2 by a camming lever on the carriage when the carriage is in its rest position, but which are spring-biassed towards their other position and are released to take up this other position when the carriage and the camming lever on it are moved away from the rest position. The operation of these contacts CC½, however, has no effect when the transceiver is being used as a transmitter.

When the carriage carrying the optical system and the marking device has completed its travel, it operates contacts CCLH (FIG. 2). This completes a power circuit for a buzzer F2 and a relay $$\frac{B}{3}$$

in parallel with one another, since the contacts CALL 2 are already operated. The buzzer F2 therefore sounds. The relay $$\frac{B}{3}$$

and its contacts B/1, B/2 and B/3 are operated when contacts CCLH complete the power circuit as described. The operation of the normally open contacts B/1, which are in parallel with the contacts CCLH, causes the relay $$\frac{B}{3}$$

to lock up and maintains power to the buzzer F2 so that this sounds continuously. The normally closed contacts B/2 open and cut off the power from the clutch release magnet CRM with the result that the scanning drum is no longer coupled to the drum motor DM and is brought to rest in its datum position in well known manner. At the same time the carriage of the optical system ceases to travel. The normally closed contacts B/3 also open and break the circuit which is supplying power to timer motor TMB of timer TB, so that timer TB returns to the standby condition and contacts TB/1 change back to their normal position connecting timer motor TMA to contacts B/2. Because contacts B/2 are open, however, no power is applied to timer motor TMA which remains at rest.

The carriage carries a member having its end face in the shape of a cone, shown at 19 in FIG. 3. As the carriage is completing its travel this cone 19 engages with a part of the pawl 17 and gradually cams the pawl 17 out of engagement with the retaining set of steps 12. At substantially the same time that the scanning drum is brought to rest in its datum position as a result of the operation of the contacts CCLH, the cone 19 moves pawl 17 completely out of engagement with the counting device 11 which is restored to its original position (as shown in FIG. 3) by the spring 16.

Although the form of the counting device 11 which has been described is the form which is at present used, it is not an entirely satisfactory form. It is expected that it will be replaced by a form in which the counting device is circular and, instead of having to be moved back five positions to restore the contacts DC1 and DC2 to their original positions, this may be done by causing the carriage at the end of its travel to move the counting device on one position.

The release of the counting device 11 allows the contacts DC1 and DC2 to return to normal. When contacts DC1 return to normal, the connection of the picture signals from modulator 10 to the line is broken and the output of the oscillator G1 is again connected to the line via operated contacts A/1 and CALL 4. This constitutes the commencement of the "Stop" signal.

The return of contacts DC2 to the normal or open condition breaks the power connection to the primary winding of the exciter lamp transformer TR2, so that the exciter lamp L3 is extinguished.

The machine remains in this state, with the buzzer F2 sounding, until the carriage of the optical system is manually restored to its initial position by the operator. When the carriage is returned to its initial position, the contacts CC½ are restored to the position shown in FIG. 2. The return movement of the carriage is towards the left, as seen in FIG. 4, and during this movement the unlatching member 7 will again strike the extension of the latch 3. The shaped portion of the unlatching member 7 will now engage this extension of the latch 3 and cause it to pivot about the point 5 at least far enough for the latch 3 to release the control switch 1 which will return to the "STANDBY" condition shown under the action of its spring (not shown). Further movement of the carriage to the left will release the latch 3 to return to the position shown. The transmitted message form is then removed from the scanning drum.

The movement of the control switch to the "STANDBY" condition returns the contacts CALL 1, 2, 3 and 4 to their normal positions as shown in FIGS. 1 and 2. The opening of contacts CALL 2 breaks the power supply to the chopper disc motor CH and the drum motor DM, both of which cease to rotate, the coil of the buzzer F2, which ceases to sound, and the coils of the relays $$\frac{A}{3} \text{ and } \frac{B}{3}$$

both of which return to the unoperated condition. The transceiver is thus returned to the standby condition and is ready for the transmission or reception of further messages.

It sometimes happens that a short message is being transmitted and that transmission time can be saved by stopping the scanning before the carriage reaches the end of its travel. In this event, as soon as the requisite length of message has been sent, the operator at the transmitter presses a "Short Message Stop" button which operates changeover contacts SMS. Power is thus connected to the relay $$\frac{B}{3}$$

and the buzzer F2, because the contacts CALL 2 are already operated, and the power supply to the clutch release magnet CRM is broken. The chain of action which follows is similar to that described when contacts CCLH are operated, i.e. the buzzer F2 sounds and the clutch release magnet CRM is released so that the drum comes to rest and the carriage stops feeding. The contacts SMS return to their normal position as soon as the "Short Message Stop" button is released. The carriage must be moved to the end of its travel, in order that the counting device 11 may be released and the "Stop" signal sent to the receiver, before being restored to its initial position to bring the transceiver back to the "STANDBY" condition, as described above for full-length message operation.

*Reception*

An incoming call commences when there is received, at the line transformer TR1 of a transceiver in the "STANDBY" condition shown in the drawings, a pulse of the same frequency as the oscillator G2. This pulse lasts approximately 3 seconds and is followed approximately 2 seconds later by a further pulse. This calling signal sequence of a 3-second pulse followed by a 2-second interval is continuously repeated until action is taken by the operator at the calling transceiver, after he was received a go-ahead signal sent from the receiver.

Each calling puse received at the line transformer TR1 travels via contacts CALL 4 and contacts REC 3 to the detector X and the receiver gain control GC. Contacts REC 2 are in the position shown in FIG. 2, so that H.T. of detector X is connected and the detector X responds to each calling pulse. The contacts DX/1 and DX/2 of the relay DX of the detector X therefore both close, with the result that a lamp L1, the receiver gain control lamp, lights and the buzzer F1 sounds for the duration of each 3-second calling pulse.

The signal level of each incoming calling pulse after it has passed through the receiver gain control GC is shown by a meter M (FIG. 1). The operator, who is called to the transceiver by the sound of buzzer F1, first sets the pointer of meter M to a desired signal level by adjusting the gain control GC. He then places a blank sheet of paper or a recording blank in such relation to a scanning drum that scanning may be immediately commenced and finally moves the control switch to the "RECEIVE" position.

Referring to FIG. 4, it will be seen that there is provided a latch 3′, similar to latch 3, mounted pivotally at a point 5′, and ganged to latch 3, and that this latch 3′ holds the control switch 1 in the "RECEIVE" position. This latch 3′ will be released during the return of the carriage, exactly as already described for latch 3.

The setting of the control switch in the "RECEIVE" position causes the contacts REC 1 and 2 (FIG. 2) and REC 3 (FIG. 1) to be operated. The contacts REC 1 are normally open contacts the closure of which causes the chopper disc motor CH, the scanning drum motor DM, and the timer motor TMA to rotate. The chopper disc is not used during reception of a message, so the rotation of the chopper disc motor CH is actually an unnecessary operation. The scanning drum motor DM is rotating in the idling condition, because the clutch release magnet CRM is at this time unoperated.

The operation of the changeover contacts REC 2 causes the H.T. voltage to be disconnected from detector X and applied instead to detector Y. Detector X, is thus prevented from responding, while detector Y, which is responsive to signals of the frequency of oscillator G1 only, is conditioned to respond.

The operation of the changeover contacts REC 3 causes the line to be connected through the line transformer TR1 and contacts CALL 4 and REC 3 to the unoperated contacts A/2 and contacts TA/2, instead of directly to detector Y and via the gain control GC to detector Y.

The operation, of the contacts REC 1 caused the timer motor TMA to start rotating, and the contacts TA/1 and TA/2 to be continuously made and broken. As the transceiver is being used as a receiver, the operations of contacts TA/1 are just idle operations having no effect.

The contacts TA/2, however, are now effective. For 300 milliseconds they connect the line through the line transformer TR1 and contacts CALL 4, REC 3 and A/2 to the output of the oscillator G2, and for the other 300 milliseconds of their cycle they connect the line to the detector Y. The transceiver acting as a called apparatus therefore sends a go-ahead signal consisting of a pulse of 300 m.s. duration of G2 frequency, followed by an interval of the same length, the sequence being continuously repeated. This go-ahead signal indicates to the operator at the calling apparatus that he may start transmission of the message.

The go-ahead signal sent from the called transceiver comprises an alternating "shout-listen" condition. This continues until the transmitting machine sends the phasing signal of G1 frequency, which will be registered by detector Y of the called transceiver during one of the "listen" periods of the go-ahead signal. The detector Y may consist of a tuned circuit which will develop a potential for use to operate a relay (not shown) and its response to the phasing signal will cause the contacts DY of this relay to operate. Detector Y should, because it controls the phasing of the receiver, be quick to operate. It is therefore necessary that the tuned circuit should have a comparatively wide band of frequency response, but this must not include the G2 frequency. The tuned circuit of detector Y could conveniently be a band-pass filter.

The contacts DY are changeover contacts and their operation completes a power circuit through operated contacts REC 1, unoperated contacts SMS, operated contacts DY and unoperated contacts CC½ to operate the relay $$\frac{A}{3}$$

and start the timer motor TMB rotating. Power for the timer motor TMA is cut off by the operation of the contacts DY.

The contacts A/1, A/2, A/3 of the relay $$\frac{A}{3}$$

are therefore operated. The operation of the contacts A/1 has no effect when the transceiver is being used as a receiver.

The operation of the changeover contacts A/2 causes the line to be connected through the line transformer TR1, contacts CALL 4, REC 3 and A/2 directly to the gain control GC and detector Y. The making and breaking of contacts TA/2 therefore now has no effect and the transceiver is continuously "listening." The operation of contacts A/3 locks up the relay $$\frac{A}{3}$$

and maintains power for the timer motor TMB.

It may appear that the relay $$\frac{A}{3}$$

will not operate and lock up properly, since the contacts A/2, as they operate, interrupt the power supply to the detector Y, which is keeping the contacts DY operated and thereby operating the relay $$\frac{A}{3}$$

It is found, however, that the momentum gained by the armature of the relay $$\frac{A}{3}$$

during the first part of its travel, combined with the natural collapse time of the detector Y circuit feeding the power to the coil of the relay $$\frac{A}{3}$$

is sufficient to ensure that the relay $$\frac{A}{3}$$

operates and locks up.

The rotation of the timer motor TMB causes the changeover contacts TB/1 to be operated 250 milliseconds after the motor TMB starts, exactly as described for use of the transceiver as a transmitter.

This operation of the contacts TB/1 prevents power from being re-applied to the timer motor TMA when contacts DY relapse. However, because the contacts DY are operated, it does not complete a power circuit for the clutch release magnet CRM. It is only when the phasing signal ceases and the contacts DY return to the unoperated condition that the power circuit for the clutch release magnet CRM is completed and the scanning drum is coupled to the drum motor DM and started to rotate from its datum rest position. It is therefore in phase with the scanning drum at the calling apparatus.

The relay $$\frac{A}{3}$$

inevitably takes a little time to operate when a phasing signal commences and it may happen that the commencement of the phasing signal occurs when there is insufficient time of a "listen" condition of the go-ahead signal at the receiver left for the relay $$\frac{A}{3}$$

to operate. In this case, contacts A/2 have not changed over before the "listen" condition finishes (since timer motor TMA runs on and contacts TA/2 will change over again), and a "shout" condition of the go-ahead signal follows. The contacts DY then return to the unoperated condition, but this does not cause a false start, since the contacts TB/1 have not changed over. It is for this reason that it is arranged that the timer motor TMB has to run for 250 m.s.—a time safely greater than the operating time of the relay $$\frac{A}{3}$$

before the contacts TB/1 change over. When a "shout" condition of a go-ahead signal occurs, the timer motor TMB naturally stops again.

As the scanning drum rotates, the contacts DC1 and DC2 will be closed as described for transmission. The closing of these contacts, however, will have no effect because the contacts CALL 4 and CALL 1 are not operated.

The carriage is fed by the rotation of the scanning drum in well-known manner, so that scanning takes place, during transmission. The contacts CC½ are operated as explained before. During this scanning however, the lamp L3 is not alight, and picture signals from the line are supplied to the marking device carried by the carriage so that the paper on the scanning drum is marked in accordance with the received picture signals.

The picture signals are of G2-frequency to which the detector Y is non-responsive. The contacts DY therefore remain unoperated during scanning until a "stop" signal of G1-frequency is received. This "stop" signal will cause buzzer F2 to sound and relay $$\frac{B}{3}$$

to operate if these actions have not already taken place. The operation of the relay $$\frac{B}{3}$$

brings the scanning drum to rest by deenergising the clutch release magnet CRM as described for transmission.

Unless the carriage has previously been stopped by a "stop" signal, the carriage will reach the end of its travel and operate the contacts CCLH, with the result that the buzzer F2 and the relay $$\frac{B}{3}$$

are both operated, because contacts REC 1 are closed. The consequences of these operations are the same as at the end of transmission, i.e. the timer TB is stopped and the clutch release magnetic CRM is de-energised, while the buzzer F2 sounds continuously. The arrivel of the carriage at the end of its travel also resets the counter, opening the contacts DC1 and DC2, but these operations have no effect at the end of reception.

Again the machine remains in this state, with the buzzer F2 sounding, until the carriage is manually returned to its initial position by the operator. When the carriage reaches its initial position, the control switch 1 is released to return to the "STANDBY" condition. The recorded message is also removed from the scanning drum.

The movement of the control switch to the "STANDBY" condition returns the contacts REC 1, 2 and 3 to their normal unoperated condition, thereby breaking the power supply to the chopper disc motor CH, the scanning drum motor DM, the buzzer F2 and the relays $$\frac{A}{3} \text{ and } \frac{B}{3}$$

The transceiver is thus returned to the standby condition awaiting the transmission or reception of further messages.

Whenever a short message is sent, the "stop" signal will arrive at the receiver before the scanning drum has come to rest as the result of operation of the contacts CCLH. In consequence of this the scanning drum at the receiver will stop, as already described, coming to rest in its datum position. The carriage too stops. The operator must then move the carriage to the end of its travel, as in short message transmission, before restoring it to its initial position when the buzzer F2 will stop sounding and the circuit will restore to the standby condition as already described.

The frequencies proposed to be used in the embodiment of the invention described are 850 c./s. for the oscillator G1 and 1800 c./s. for the oscillator G2. It will be understood, however, that the invention is in no way limited to the use of these particular frequencies.

The alternating current power levels sent to and received from the line during facsimile working may be very low, sometimes only a few microwatts. With such low power levels, difficulty sometimes arises in making connections through contacts which are actuated by moderate mechanical forces such as are commonly available from small synchronous motors of the timer-driving class.

In order to improve the reliability of the circuit of FIG. 1 in a facsimile transceiver, it is proposed that the timer contacts TA/1 and TA/2 be replaced by an electromagnetic means of connection and disconnection such as that shown in FIG. 5. The actual arrangement shown in FIG. 5 is one suitable for replacing the timer contacts TA/1 for sending the interrupted calling pulses.

Instead of being connected to the three parts of the changeover contacts TA/1, as previously described with reference to FIG. 1 for the time when the transceiver was transmitting calling pulses, the line, the oscillator G2 and the detector X are connected respectively to the coil windings 21, 22 and 23 shown in FIG. 5. The windings 21, 22 and 23 are each associated with a respective one of the arcuate surfaces 24, 25 and 26 of a stator 27 made of a magnetic material of high permeability and low loss. A multi-armed rotor 28, also made of magnetic material of high permeability and low loss, is carried by a shaft 29 which is rotated by a motor (not shown in FIG. 5) which corresponds to the timer motor TMA. The multi-armed rotor 28 is arranged so that its arms move successively past the surfaces of the stator, i.e. as one arm moves away from one end of the surfaces of the stator, so the next arm starts to move over the other end of the stator surfaces.

When the extremity of one orm of the rotor 28 is adjacent the surfaces 24 and 25, power from the oscillator G2 is connected to the line by the transformer action of coils 21 and 22. When the extremity of the arm of the rotor 28 is adjacent the surfaces 24 and 26, the line is connected to the detector X by the transformer action of coils 21 and 23. In this way the alternate "shout-listen" condition of the calling signal is imposed on the line by the transceiver.

It will have been noted that the facsimile transceiver described, when it is ready to receive picture signals from a calling apparatus, sends a go-ahead signal back which has a distinctive rhythm. It would equally be within the ambit of the invention, for the go-ahead signal to be distinctive on account of its pitch, for example a pulse of a first frequency, the response to which lights one lamp, immediately followed by a pulse of a second frequency the response to which lights another lamp, immediately followed by a pulse of a third frequency which causes a third lamp to light. After an interval for the "listen" condition of the go-ahead signal, this sequence would be repeated. Such a sequence of lamp-lighting at the calling apparatus would be seen by the operator during each "listen" period of the calling signal.

Again it is possible to make use of the timbre or quality of the go-ahead signal to make it distinctive to the calling operator. Loudspeakers could be fitted to make the actual signals received audible to the calling operator, who would then pick out the genuine go-ahead signals by their distinctive signal to noise ratio, thus using their quality and pitch to distinguish them from interference.

In a control system of the kind described in which the go-ahead signal is detected by human agency, a period must elapse before the operator can reach a decision as to whether the signal is genuine. This period contributes at least part of the interval which must be afforded for the recording scanner motors to reach synchronous speed.

It is convenient for the visual indication of the go-ahead signal at the calling transceiver to draw the calling operator's attention to the control which has to be operated next—in this case the "send" switch. Similarly it is convenient for the visual indication of the calling signal at the called transceiver to draw the attention of the operator there to the next control which he has to operate, i.e. the gain control.

While the principles of the invention have been described above in connection with specific embodiments, and particular modifications thereof, it is to be clearly understood that this description is made only by way of example and not as a limitation on the scope of the invention.

What I claim is:

1. Facsimile transceiver apparatus comprising switching means for conditioning the apparatus to act as either a transmitter or a receiver, a scanning system, means for transmitting either of two frequencies, two detector means each capable of detecting a different one of the said two frequencies, first timer means operative when the apparatus is conditioned as a transmitter for sending out a series of calling pulses of one of the said frequencies having a certain repetition rate, second timer means operative when the apparatus is conditioned as a receiver for sending out a series of receiver-ready pulses of the said one frequency having a repetition rate substantially faster than that of the said calling pulses, third timer means operative when the apparatus is conditioned as a transmitter for terminating the transmission of a phasing signal of the other of the said frequencies at an instant indicative of the phase relationship between the scanning system and a message to be scanned, and means operative when the apparatus is conditioned as a receiver for causing relative movement between the scanning system and a message to be scanned to commence from a datum position upon termination of a received phasing signal.

2. In a facsimile scanning system for transmitting and receiving information signals indicative of information stored on a message sheet, a transmitter and a receiver interconnected over a communication line, call means in said transmitter for transmitting a calling signal to the receiver to prepare it for reception, detector means in the said transmitter for detecting a receiver-ready signal transmitted from the receiver, timing means, and means controlled by the said timing means for periodically interrupting the said transmission of the call signal and for connecting the said detector means to the line during said interruptions.

3. In a facsimile scanning system as set forth in claim 2, phasing means in the said transmitter, means responsive to the detection by the detector means of the said receiver-ready signal for transmitting a phasing signal to the said receiver, and means for terminating the transmission of the phasing signal after a predetermined time interval to cause the scanning of the message by the transmitter and the transmission of intelligence signals to the receiver.

4. A facsimile scanning system as set forth in claim 3 wherein said calling signal consists of a series of pulses of a first frequency, the said receiver-ready signal consists of a series of pulses of the said first frequency having a distinctive rhythm, and the said phasing signal consists of a continuous signal of a second frequency, each of said frequencies lying within the voice frequency band.

5. In a facsimile scanning system as set forth in claim 4, means responsive to the completion of the scanning of the message sheet for transmitting a stop signal of the said second frequency.

6. In a facsimile scanning system for transmitting and receiving information signals indicative of information stored on a message sheet, a transmitter and a receiver interconnected over a communication line, detecting means in said receiver for detecting a calling signal transmitted from said transmitter, timing means, means controlled by the said timing means for periodically connecting the detecting means to the line, means in the receiver responsive to the detection of a calling signal by said detecting means for transmitting a receiver-ready signal to the transmitter during the intervals between successive connections of the said detecting means to the line.

7. In a facsimile scanning system as set forth in claim 6, means for detecting a phasing signal from said transmitter and for conditioning the said receiver to receive information signals from said transmitter, and means responsive to said detecting means upon the termination of said phasing signal for operating the receiver to receive transmitted information signals.

8. In a facsimile scanning system as set forth in claim 7, means in the receiver for detecting a stop signal transmitted by the said transmitter, and means responsive to the detection of said stop signal by said stop-signal-detecting-means for restoring the receiver to its unoperated condition.

References Cited in the file of this patent

UNITED STATES PATENTS

| | | |
|---|---|---|
| 2,672,503 | Hallden et al. | Mar. 16, 1954 |
| 2,767,242 | Ridings et al. | Oct. 16, 1956 |